US012070972B2

(12) United States Patent
Barton

(10) Patent No.: US 12,070,972 B2
(45) Date of Patent: Aug. 27, 2024

(54) TRUCK TIRE WITH STIFF OUTER BEAD PRODUCTS

(71) Applicants: Compagnie Generale des Etablissements Michelin, Clermont-Ferrand (FR); Christopher Barton, Clemson, SC (US)

(72) Inventor: Christopher Barton, Clemson, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 186 days.

(21) Appl. No.: 17/780,575

(22) PCT Filed: Dec. 18, 2019

(86) PCT No.: PCT/US2019/067132
§ 371 (c)(1),
(2) Date: May 27, 2022

(87) PCT Pub. No.: WO2021/126187
PCT Pub. Date: Jun. 24, 2021

(65) Prior Publication Data
US 2022/0410638 A1  Dec. 29, 2022

(51) Int. Cl.
*B60C 15/06* (2006.01)
(52) U.S. Cl.
CPC ...... *B60C 15/0607* (2013.01); *B60C 15/0628* (2013.01); *B60C 2015/0621* (2013.01); *B60C 2015/065* (2013.01); *B60C 2200/06* (2013.01)

(58) Field of Classification Search
CPC ............ B60C 15/06; B60C 15/0607; B60C 2015/061; B60C 2015/0614;
(Continued)

(56) References Cited

U.S. PATENT DOCUMENTS 4,227,563 A  10/1980  Grosch et al.

FOREIGN PATENT DOCUMENTS

DE  2007042119  *  4/2007
WO  2019002726 A1  1/2019
(Continued)

OTHER PUBLICATIONS

European Patent Office, International Search Report dated Sep. 17, 2020, pp. 1-12 (included), European Patent Office, Rijswijk, The Netherlands.

*Primary Examiner* — Justin R Fischer
(74) *Attorney, Agent, or Firm* — Neal P. Pierotti

(57) ABSTRACT

A heavy truck tire is provided with a bead design that has a bead core and a reinforcement ply that wraps around a section of the bead core and has a return casing ply. Bead filler is present that has a portion radially outward from the bead core and axially inboard from the return casing ply. A stiffener layer is present that has a portion located outboard from the return casing ply. The bead has a first bead layer with a portion between the return casing ply and the stiffener layer, and a second bead layer that has a portion outboard from the stiffener layer. The stiffness of the first and second bead layers is 8 MPa to 14 MPa. The stiffness of the bead filler is less than the stiffness of the first and second bead layers.

7 Claims, 6 Drawing Sheets

(58) Field of Classification Search
CPC .... B60C 2015/0617; B60C 2015/0621; B60C 2015/0625; B60C 15/0603; B60C 15/0628; B60C 2015/042; B60C 2015/044; B60C 2015/046; B60C 2015/048

See application file for complete search history.

(56) References Cited

FOREIGN PATENT DOCUMENTS

| | | | |
|---|---|---|---|
| WO | 2019108207 | A1 | 6/2019 |
| WO | 2019231438 | A1 | 12/2019 |

\* cited by examiner

TRUCK TIRE WITH STIFF OUTER BEAD PRODUCTS

CROSS-REFERENCE TO RELATED APPLICATIONS

The present application is a 35 U.S.C. § 371 application of PCT/US2019/067132 filed on Dec. 18, 2019 and entitled "Truck Tire with Stiff Outer Bead Products." PCT/US2019/067132 is incorporated by reference herein in its entirety for all purposes.

FIELD OF THE INVENTION

The subject matter of the present invention relates to a truck tire that has a bead design that has stiff outer bead products. More particularly, the present application involves a bead design that features stiff products strategically placed to reduce or eliminate bending hot spots and to improve resistance to heat.

BACKGROUND OF THE INVENTION

Heavy commercial truck tires have a tread area that engages the road surface, and a carcass with sidewalls that extend from the tread area. The sidewalls terminate in beads that are designed to engage a rim of the wheel. The beads include a bead core made of steel and other bead tissues that can be composed of rubber. In order to improve performance of the truck tire it is desirable to lighten the weight of the bead core, for example by reducing the number of rods of the bead core. However, reduction in the size of the bead core causes more flexing in the tire. To compensate for this flexing the area radially above the bead core, sometimes referred to as bead filler, includes a rubber portion that is more stiff. This bead filler is coextruded so that the stiffer rubber first portion is on the inboard side of the tire in the axial direction, and the more flexible second portion is on the outboard side of the tire in the axial direction. However, the use of a two zone bead filler requires these products to be formed via coextrusion which can add cost and complexity to the manufacturing process. Additionally, the use of a two zone bead filler does not eliminate the magnitude of bending caused by the bead core, but simply moves this bending to a location more outward in the radial direction. With this design, additional products outboard in the radial direction, which are sometimes referred to as a first bead layer and a second bead layer, are made of rubber materials that have the same stiffness as the flexible second portion.

The first and second bead layers are made of materials that are more flexible than the stiff first portion of the bead filler, and may have a stiffness of 3.6 with reasonably high cohesion properties. It is also known to provide first and second bead layers that have a higher stiffness at 5.5 MPa that achieve lower hysteresis but with the compromise of lower cohesion. Even at 5.5 MPa, the material making up the bead layers in this version is still more flexible than the stiffer mixes in the stiffer rubber first portion of the bead filler. In addition to the coextruded, two portion bead core, a chafer is included that wraps completely around the bead core. These configurations are difficult to build, expensive, and leaves the end of the turnup ply exposed. As such, there is a need to reduce or eliminate a bending hot spot in heavy truck tires, and to improve heated rim performance of the tire without adding significant cost to the tire.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
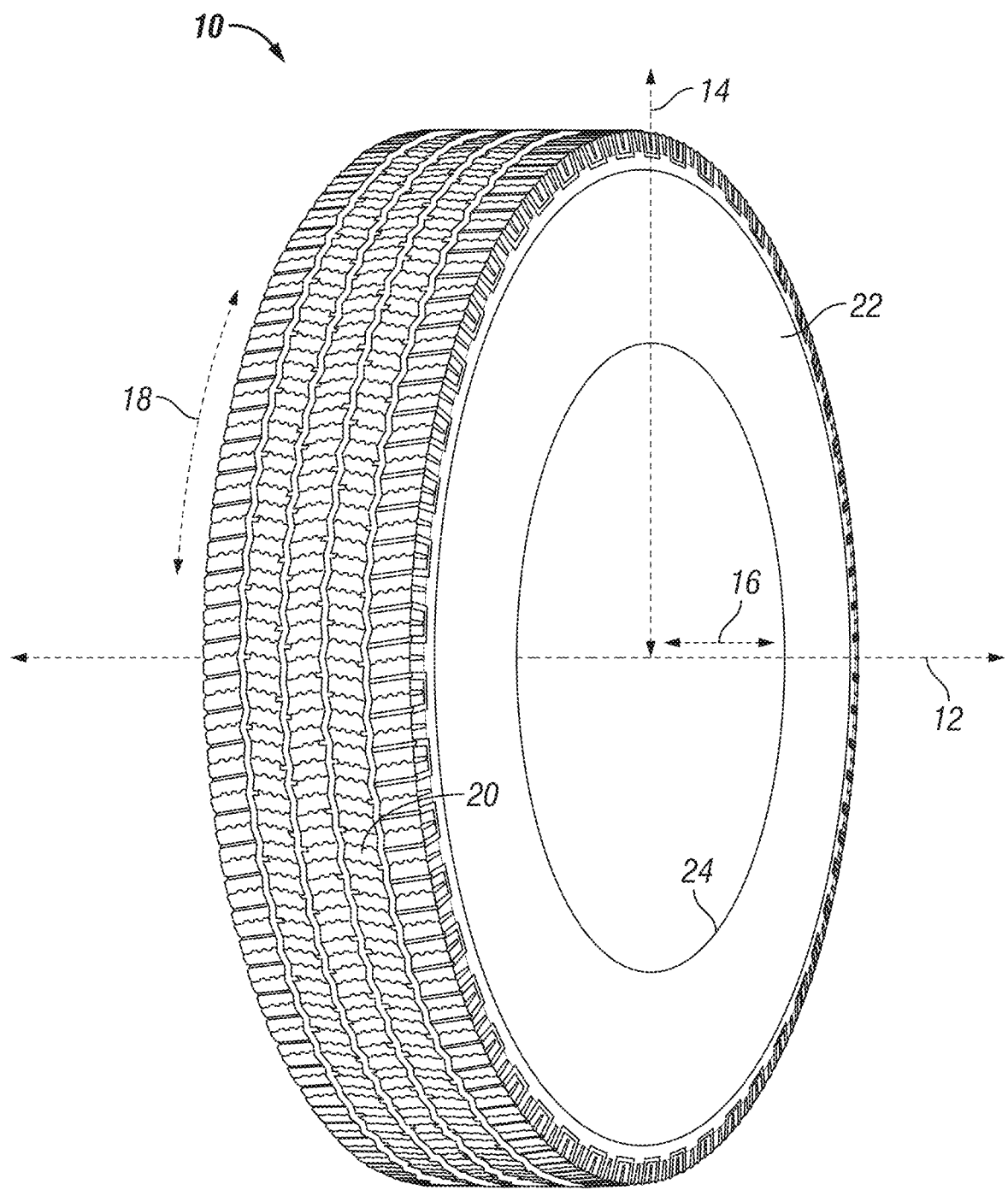
FIG. 1 is a perspective view of a heavy truck tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a bead 24 design of a heavy duty truck tire 10 that features first and second bead layers 40, 42 that are stiffer than a bead filler 36 portion of the bead 24. The stiffness of the first and second bead layers 40, 42 is 8 MPa to 14 Mpa. This configuration of the bead 24 reduces or eliminates a bending hot spot that may or may not be present just above the bead core 28. Further, this configuration may achieve higher heat resistance in the tire 10 such as improved heated rim performance. The provided design achieves casing ply unwrapping under high heat and load while at the same time providing improved resistance to casing ply fatigue in the bead zone. The provided configuration offers a way to avoid extending the chafer ply under the bead core 28, which poses significant fabrication issues, including uniformity, which increases fabrication costs.

FIG. 1 shows a tire 10 that is a heavy duty truck tire 10. In this regard, the tire 10 is not designed for nor used with a car, motorcycle, or light truck (payload capacity less than 4,000 pounds), but is instead designed for and used with heavy duty trucks such as 18 wheelers, garbage trucks, or box trucks. The tire 10 may be a steer tire, a drive tire, a trailer tire, or an all position tire. The tire 10 includes a casing 22 onto which a tread 20 is disposed thereon. The bead 24 is a part of the casing 22 that is at the inner radial end of the casing 22 closest to the central axis 12. The central axis 12 of the tire 10 extends through the center of the casing 22, and the axial direction 16 of the tire 10 is parallel to the central axis 12. The radial direction 14 of the tire 10 is perpendicular to the central axis 12, and the tread 20 is located farther from the central axis 12 in the radial direction 14 than the casing 22. The tread 20 extends all the way around the casing 22 in the circumferential direction 18 of the tire 10 and circles the central axis 12 360 degrees.

Figure 2:
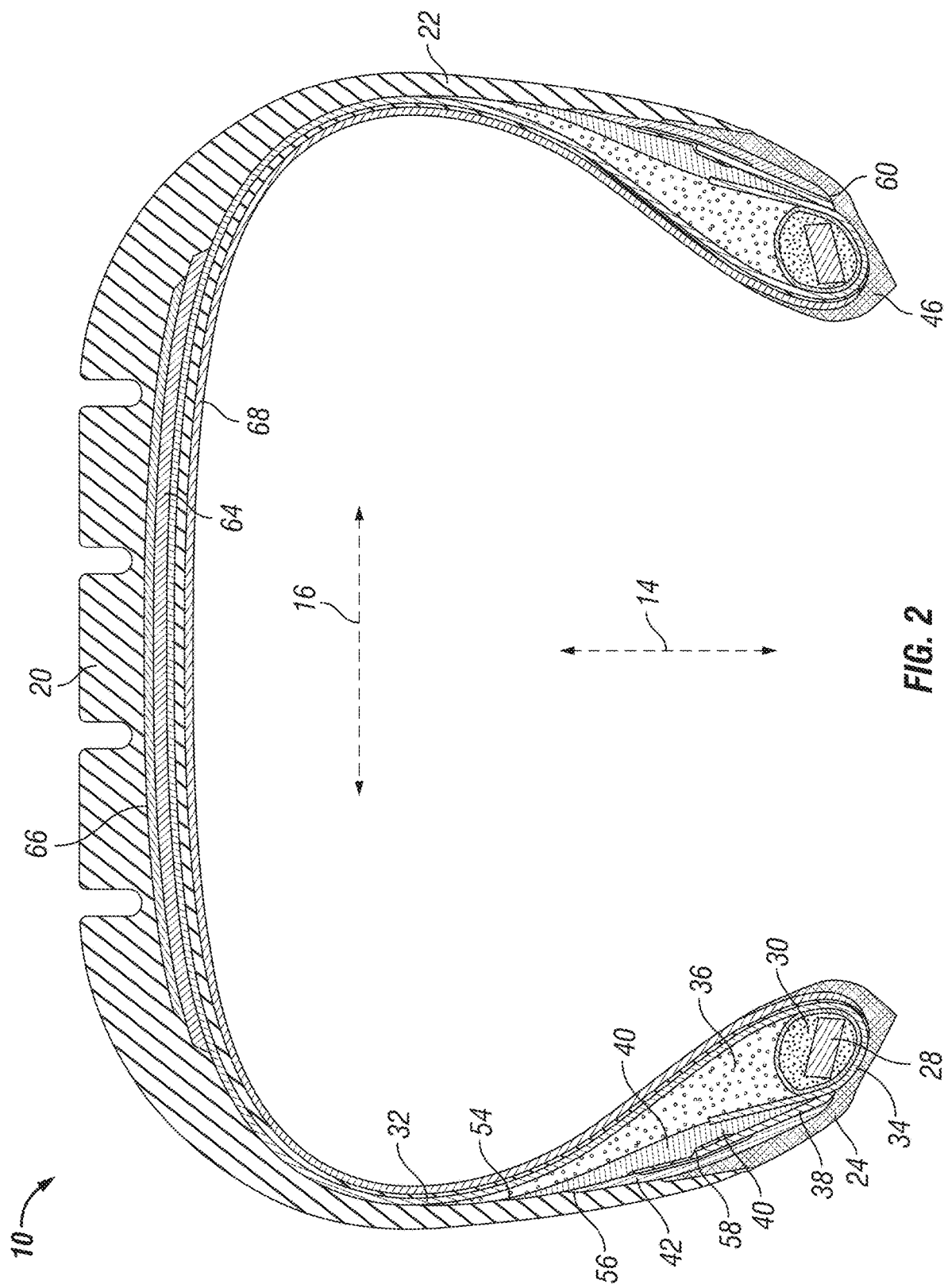
FIG. 2 is a cross-sectional view of a radial cut of a truck tire with all items in cross-section as the tire would look when mounted to a rim.

FIG. 2 is a radial cut of a tire 10 in accordance with one exemplary embodiment. Various tissues, sometimes called products, composed of different materials can be present throughout the tire 10. The tread 20 of the tire 10 is shown as being located farthest from the axial center of the tire 10 in the radial direction 14. A first belt layer 64 and a second belt layer 66 are located below the tread 20 in the radial direction 14 and comprise belts for use in strengthening and holding the form of the tire 10. The reinforcement belts of the layers 64, 66 may be crossed relative to one another, and in some instances they can be arranged at an angle of 20 degrees to one another. The casing 22, or carcass, extends from the tread 20 and includes sidewalls of the tire 10 terminating in a pair of beads 24 that are arranged for mounting onto the rim of the wheel of the vehicle. A bead core 28 is located in each one of the beads 24 and is present to provide strength and a gripping force in the bead 24 for retention onto the rim. The left hand side bead 24 can be a mirror image of the right hand side bead 24 and both beads 24 can have products that are made of the same material. Some of the tissues/products are located only in the bead 24, while others are located in the bead 24 and extend therefrom. For instance, an inner liner 68 is inside of the bead 24 and extends to an inner, exterior side of the bead 24 before extending up the sidewall of the casing 22. The inner liner 68 then extends across the entire inner side of the crown in the axial direction 16 before extending into and forming the inner side of the right hand side wall of the casing 22. The inner liner 68 then terminates inside of the right hand side bead 24 and is arranged in a similar mirror-image manner to its presence in the left hand side bead 24. The inner liner 68 is thus a product of the tire 10 that extends all the way from one bead 24 to the other bead 24 and is made of a material that is fluid tight so that fluid between the tire 10 and rim is maintained therein for purposes of maintaining inflation pressure of the tire 10.

The tire 10 includes a tissue designated as a reinforcement ply 32 that is located within one of the beads 18 and extends through the casing 12 and crown to the other bead 18. The reinforcement ply 32 wraps around the bead core 20 and is designated as a return casing ply 34 in the location outward in the axial direction 28 from the bead core 20. Other tissues in the tire 10 such as a stiffener layer 40 and a bead filler 42 do not extend into the sidewalls of the casing 12 or the crown, but are instead only located in the bead 18. Relative positions in the axial direction 16 can be described with respect to inboard and outboard positions. The most inboard point of the tire 10 may be the radial direction line 14 shown in FIG. 2 as it is located at the center of the tire 10 in the axial direction 16. The center of the tire 10 is inboard of both of the beads 24 in the axial direction 16. As another example, the second bead layer 42 is outboard of the bead core 28 in the axial direction 16.

Figure 3:
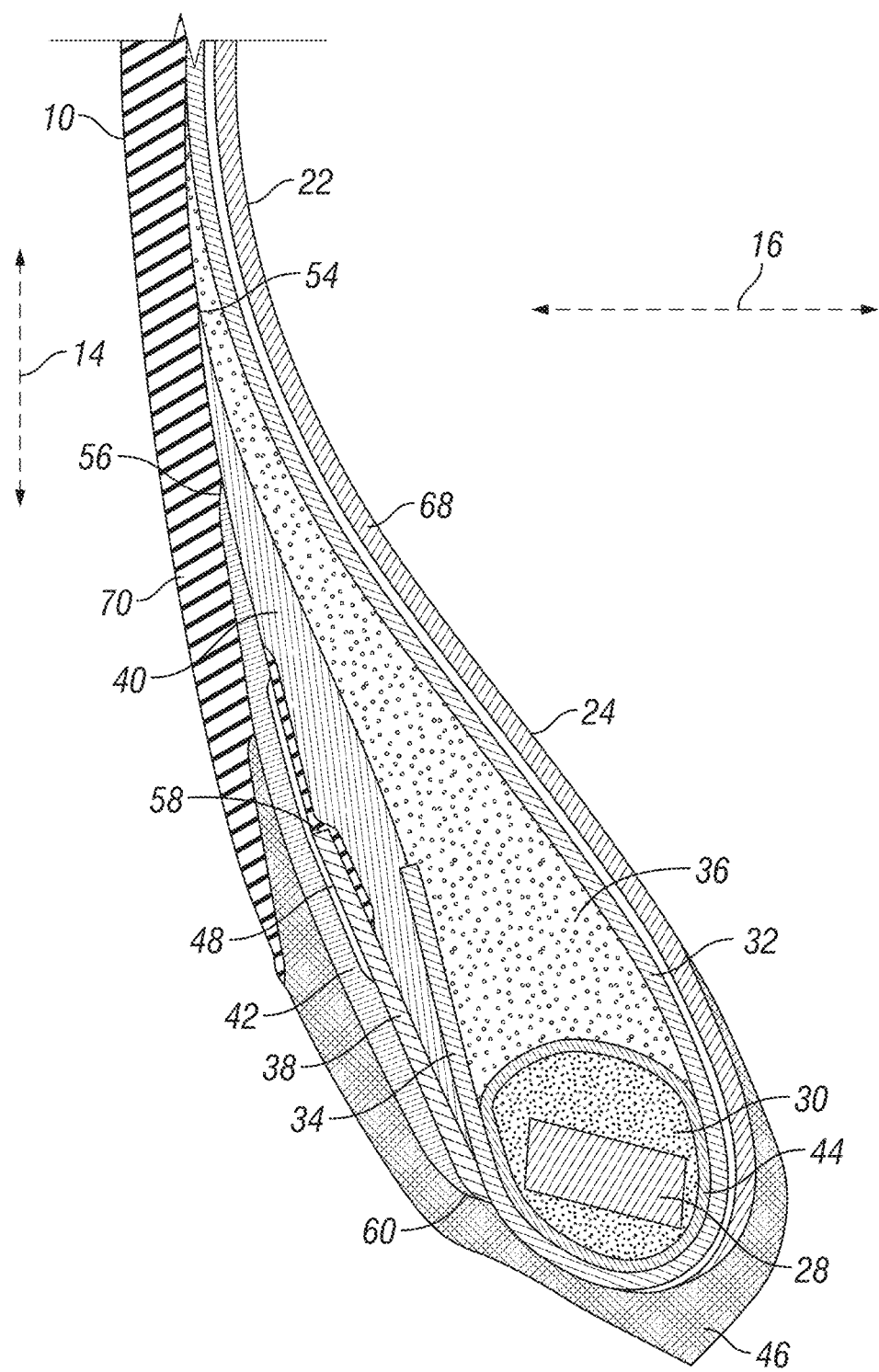
FIG. 3 is a cross-sectional view of a bead as it would look when mounted to a rim in accordance with one exemplary embodiment.

FIG. 3 is a close up view of the left hand side bead 24 in accordance with another exemplary embodiment. The bead core 28 is made up of one or more steel rods. The bead core 28 is surrounded by the padding gum 30 and in some instances may be completely surrounded on all sides by the padding gum 30. Surrounding the bead core 28 is a wrapping tissue 44 that can be made of nylon in some embodiments. The rod making up the bead core 28 is shown as a single piece and has a rectangular cross-sectional shape. This single piece can actually be many rods arranged together in the shape of a rectangle. However, in other embodiments the bead core 28 can be made of multiple components and these components could have any cross-sectional shape. The wrapping tissue 44 wraps around the padding gum 30 and overlaps itself to form an overlap. The wrapping tissue 44 may have a stiffness of 14 MPa and can be made of a rubber mix and textile which in some instances can be a nylon ply, the padding gum 30 can be a rubber mix and may have a stiffness of 28 MPa, and the bead core 28 can be made of steel or aluminum and can have a stiffness of 30,000,000 MPa in some embodiments. The bead core 28 can be lightened so that a smaller rod can be used to improve performance properties of the tire 10.

The bead 24 includes bead filler 36, sometimes referred to as gum stuffing, that is between and engages both the reinforcement ply 32 and the return casing ply 34. The wrapping tissue 44 engages the bead filler 36, the reinforcement ply 32, and the return casing ply 34. The wrapping tissue 44 functions to stabilize the geometry of the padding gum 30 and the bead core 28. If the wrapping tissue 44 were not present, the padding gum 30 would assume a more square shape upon formation, and would assume a more oval shape when the tire 10 is used. The wrapping tissue 44 thus causes the tissues of the bead 24 to be desirably shaped so that they can function in an intended manner. It is to be understood that other truck tires 10 can be made without a wrapping tissue 44 and can function in a completely normal and safe manner. The addition of a wrapping tissue 44 may provide an even higher bead 24 endurance performance than in those instances in which a wrapping tissue 44 is absent in the bead 24. However, various truck tire 10 designs exist that are fully functional and safe that both include and do not include a wrapping tissue 44.

The bead filler 36 is a rubber mix that is different than the rubber mix making up the padding gum 30. The material making up the bead filler 36 is more flexible than the material making up the padding gum 30. The bead filler 36 can have a stiffness from 3.6 MPa to 5.6 MPa. The bead filler 36 engages the wrapping tissue 44, the reinforcement ply 32 and the return casing ply 34, and may extend from the reinforcement ply 32 to the return casing ply 34 in the axial direction 16. The bead filler 36 can be a material or composite material that has the same stiffness at all points, as distinguished from a two zone bead filler 36 that has a stiffer portion and a more flexible portion. The configuration of the bead 24 provides a way to use softer rubber which is desirable for impact and aging resistance. The bead filler 36 is a product that is not coextruded and can be a single, soft product as compared to some other stiffer products of the bead 24. In some exemplary embodiments, no product/portion of the bead 24 is formed by coextrusion or is a coextruded product. The return casing ply 34 is a portion of the reinforcement ply 32 that is on the outboard side of the bead core 28 in the axial direction 16. The return casing ply 34 may begin at the most inward portion of the reinforcement ply 32 in the radial direction 14. The bead filler 36 ends in the bead 24 or in some instances may be a product that extends into the sidewall of the tire 10. However, the bead filler 36 does not extend all the way under the belt layers 64, 66 to the other sidewall of the tire 10. The reinforcement ply 32 is a composite material that includes metal cords and a rubber mix. The reinforcement ply 32 in the direction of its cords is stiffer than the wrapping tissue 44, the bead filler 36, and the padding gum 30. The reinforcement ply 32 extends from the bead 24, through the sidewall, under the belt layers 64, 66, and then into the opposite sidewall and down into the bead 24 on the right hand side of the tire 10.

The stiffener layer 38 is located outboard from the return casing ply 34 in the axial direction 16 and contacts the return casing ply 34 along a portion of its length. The stiffener layer 38 terminates in the bead 24 so that some of it is located inward in the radial direction 14 from the bead core 28. Other portions of the stiffener layer 38 are outward in the radial direction 14 from the bead core 28. The stiffener layer 38 can be made of a combination of steel and rubber, and this rubber may have a stiffness of 10 MPa. The bead 24 includes an anti-abrasive strip 46 that is on the outside of the bead 24 and designed to engage the rim. The anti-abrasive strip 46 engages the stiffener layer 38, but need not in other arrangements. The stiffener layer 38 in FIG. 3 extends outward in the radial direction 14 to have a portion outward of the bead core 28, and the return casing ply 34 in the radial direction 14.

The first bead layer 40 is a product of the tire 10 made of rubber that has a portion located between and engaging the return casing ply 34 and the stiffener layer 38 in the axial direction 16. The first bead layer 40 extends outward in the radial direction 14 and engages the bead filler 36. The first bead layer 40 terminates at an outward radial terminal end 54 that is positioned inward of a portion of the bead filler 36 in the radial direction 14. The first bead layer 40 may terminate in the bead 24, and may or may not extend to the sidewall of the tire 10. However, the first bead layer 40 does not extend to be under the belt layers 64, 66, and does not extend to the right hand side sidewall or right hand side bead 24. The second bead layer 42 is likewise a product of the tire 10 made of rubber, and has a portion between and engaging the stiffener layer 38 and the anti-abrasive strip 46. The second bead layer 42 extends outward in the radial direction 14 and engages the first bead layer 40, terminating at an outward radial terminal end 56 that is short of the outward radial terminal end 54 so that a portion of the first bead layer 40 is outward in the radial direction 14 from the entire second bead layer 42. The outward radial terminal end 54 is outward in the radial direction 14 from the outward radial terminal end 56. An opposite inner radial terminal end 60 of the second bead layer 42 is located at an inner radial terminal end of the stiffener layer 38 and is outboard of the bead core 28 in the axial direction 16. As with the first bead layer 40, the second bead layer 42 may extend into the sidewall of the tire 10, but does not extend over to the second sidewall or the right hand side bead 24 of the tire 10. The second bead layer 42 engages a sidewall product 70 that is in the sidewall and that may have a stiffness that is 3.6 to 5.6 MPa. The first bead layer 40 and the second bead layer 42 are both interior products of the tire 10 and do not have any portions that form the outer surface of the tire 10.

The first bead layer 40 has a stiffness that is 8-14 MPa. Likewise, the second bead layer 42 has a stiffness that is 8-14 MPa. In some embodiments the stiffness of the first bead layer 40 is the same as the stiffness of the second bead layer 42. In other embodiments the stiffness of the second bead layer 42 is different from the stiffness of the first bead layer 40. The first bead layer 40 can have a stiffness that is 8 MPa, 8.5 MPa, 14 MPa, 10 MPa, 11 MPa, 12 MPa, from 9-13 MPa, from 10-12 MPa, or from 9.5-11.5 MPa in accordance with certain exemplary embodiments. The second bead layer 42 can have a stiffness that is 8 MPa, 8.5 MPa, 14 MPa, 10 MPa, 11 MPa, 12 MPa, from 9-13 MPa, from 10-12 MPa, or from 9.5-11.5 MPa in accordance with certain exemplary embodiments. The stiffness of the first bead layer 40 and the stiffness of the second bead layer 42 are both greater than the stiffness of the bead filler 36 so that the first bead layer 40 and the second bead layer 42 are each more stiff than the bead filler 36. Although various stiffness amounts for the first and second bead layers 40, 42 are provided, the preferred embodiment employs a first bead layer 40 that has an 8.5 MPa stiffness, and a second bead layer 42 that has an 8.5 MPa stiffness.

The first and second bead layers 40, 42 extend so as to have a portion be inward in the radial direction 14 from the farthest inward radial extent of the return casing ply 34. The first bead layer 40 completely fills the void, with the exception possibly of tape 48, between the return casing ply 34 and the stiffener layer 38, sometimes referred to as a chafer. The second bead layer 42 should completely fill the void, with the exception of possibly tape 48, between the stiffener layer 38 and the anti-abrasive strip 46. The provided design thus utilizes stiffer products 40, 42 in the outboard zone of the bead 24. Further, the provided design does not use a stiff product directly against the reinforcement ply 32 interior (inboard in the axial direction 16) side. The current design spreads hydrostatic stresses from the rim flange over a much larger zone than if the stiff layer were against the reinforcement ply 32. This spreading reduces concentrated bending spots in the reinforcement ply 32 over the entire region of the bead 24, thus improving fatigue performance of the reinforcement ply 32. The present configuration provides resistance to casing ply unwrapping because of the rigid and cohesive first bead layer 40 shearing against the return side of the casing ply. The first and second bead layers 40 and 42 also provide rigidity to the working (interior side) of the casing ply to resist fatigue.

The present application describes the stiffness of a product or material. The stiffness that is being referred to is the Young's modulus which is the stiffness of an elastic material, or elastic modulus. The stiffness is provided in measurements of mega pascals (MPa). The stiffness material property in question that is being referred to is MA10. This stiffness property can be calculated using French standard NF T 46-002, September 1988.

Tape 48 is located in the bead 24 and engages the second bead layer 42, the stiffener layer 38, and the first bead layer 40. The tape 48 may be present on the end of the stiffener layer 38 when the stiffener layer 38 is assembled into the green tire 10 before curing. The tape could be wrapped around the outward radial terminal end 58 in this regard before and after assembly of the stiffener layer 38 into the tire 10. Although the tape 48 is shown as being present, it is to be understood that the tape 48 is not present in the tire 10 in other exemplary embodiments of the tire 10. The provided configuration of the bead 24 allows the elimination of tape 48 at the ends of all products thus decreasing cost of the tire 10 and reducing complexity of the tire 10.

An alternate design of the bead 24 is illustrated in FIG. 4 which again shows the left hand bead 24 (the right side bead 24 being a mirror image) in cross-section. The products of the FIG. 4 design and their arrangement are the same as that previously discussed and a repeat of this information is not necessary. However, there are some differences in the configuration of the first and second bead layers 40 and 42. The lengths of the bead layers 40, 42 are shortened in the radial direction 14 so that they are shorter in the FIG. 4 embodiment than in the FIG. 3 embodiment. The bead layers 40, 42 extend in the radial direction 14 so that the outward radial terminal ends 54, 56 terminate at an outward radial terminal end 58 of the stiffener layer 38 in the radial direction 14. This termination may be exactly at the radial position of the end 58, or the three ends 54, 56, 58 could be not exactly at the same position in the radial direction 14 but could be very close to one another such as a few millimeters to one another in the radial direction 14. As such, when described as having ends that terminate in the same radial location it is to be understood that there can be some tolerance in the regard, and the ends 54, 56, 58 could be up to 7 millimeters difference in location in the radial direction 14 but still be considered to be terminating at the same radial location due to this close proximity.

Figure 4:
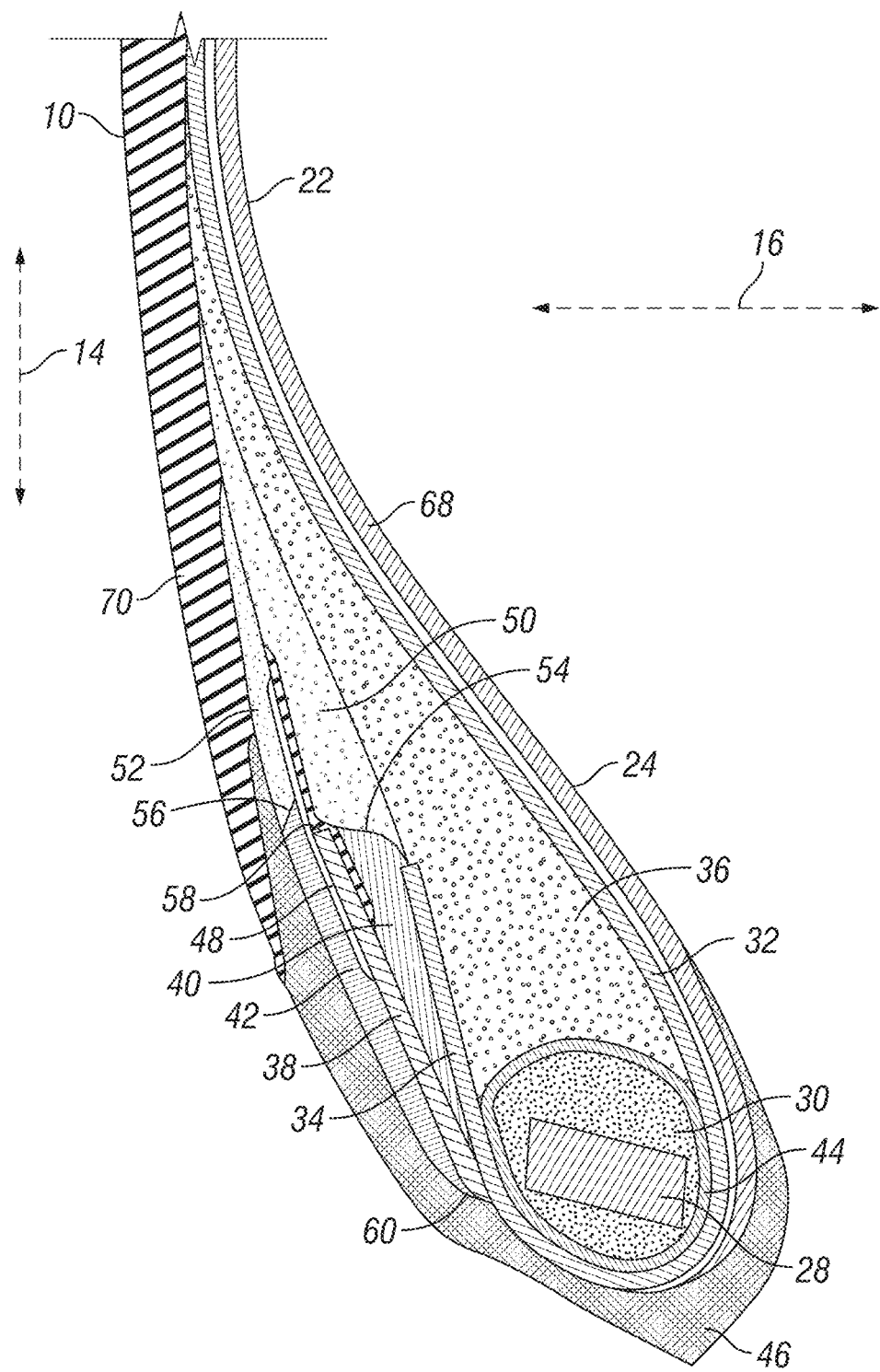
FIG. 4 is a cross-sectional view of a bead that has first and second flexible layers in accordance with another exemplary embodiment.

The FIG. 4 embodiment likewise differs from the FIG. 3 embodiment in that a product that is a first flexible layer 50 is present that engages the outward radial terminal end 54 and extends outward in the radial direction 14 to engage the bead filler 36, the sidewall product 70, and the second flexible layer 52. The first flexible layer 50 extends farther outward in the radial direction 14 than the second flexible layer 52. The second flexible layer 52 engages the outward radial terminal end 56 and extends outward in the radial direction 14 terminating short of the termination point of the first flexible layer 50. The second flexible layer 52 additionally engages the first flexible layer 50, the sidewall product 70, and the anti-abrasive strip 46. The majority of the second flexible layer 52 is located outboard from the first flexible layer 50 in the axial direction 16.

The stiffness of the first flexible layer 50 is less than the stiffness of the first bead layer 40 and the stiffness of the second bead layer 42. Likewise, the stiffness of the second flexible layer 52 is less than the stiffness of layers 40 and 42. The stiffness of the first flexible layer 50 is 3.6-5.6 MPa, and the stiffness of the second flexible layer 52 is 3.6-5.6 MPa. The first and second flexible layers 50, 52 are softer and have lower hysteresis than the layers 40 and 42. The stiffness of the first flexible layer 50 may be the same as the stiffness of the second flexible layer 52, or they can be different from one another. The stiffness of the bead filler 36 may be the same as the stiffness of the first flexible layer 50, and can be the same as the stiffness of the second flexible layer 52, or can be different than these layers 50 and 52. The configuration in FIG. 4 still provides the cohesion and rigidity needed to resist reinforcement ply 32 fatigue and unwrapping, while keeping lower hysteresis and rigidity in the upper part of the bead 24 zone where there is more deflection. In this upper zone, the rigidity is not needed and the higher hysteresis contributes to a higher rolling resistance of the tire 10 which is not desired.

Figure 5:
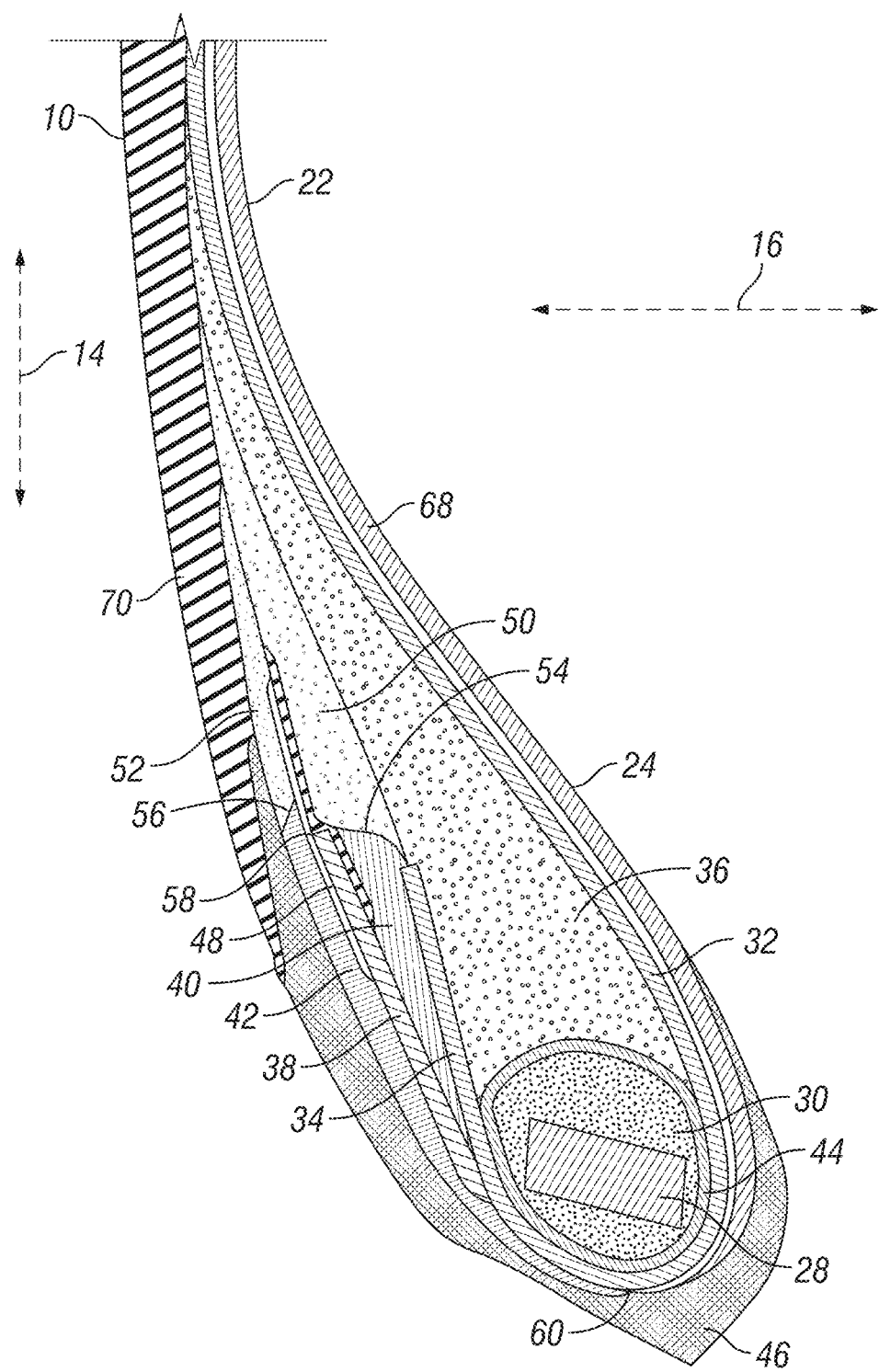
FIG. 5 is a cross-sectional view of a bead that has a second bead layer that extends under the bead core in accordance with yet another exemplary embodiment.

Another exemplary embodiment of the tire 10 is shown in FIG. 5 that includes products configured like those of FIG. 4 such that a repeat of this information is not necessary. The difference in FIG. 5 concerns the second bead layer 42 that extends a farther distance inward in the radial direction 14 than it does in the FIG. 3 or 4 embodiments. Here, the second bead layer 42 wraps around a portion of the bead core 28 and terminates at a location in the radial direction 14 that is inward of the entire bead core 28, the entire bead filler 36, the entire first bead layer 40, and the entire stiffener layer 38. As described herein, when a component is wrapped around another it may or may not engage that component. The second bead layer 42 engages the return casing ply 34. If the second bead layer 42 is extended far enough, additional casing ply unwrapping performance could be expected as well as resistance to mounting damage. The illustrated arrangement of the second bead layer 42 in FIG. 5 can be used with any of the variously described embodiments of the bead 24 of the tire 10 herein and need not be only used in connection with the FIG. 4 embodiment.

Figure 6:
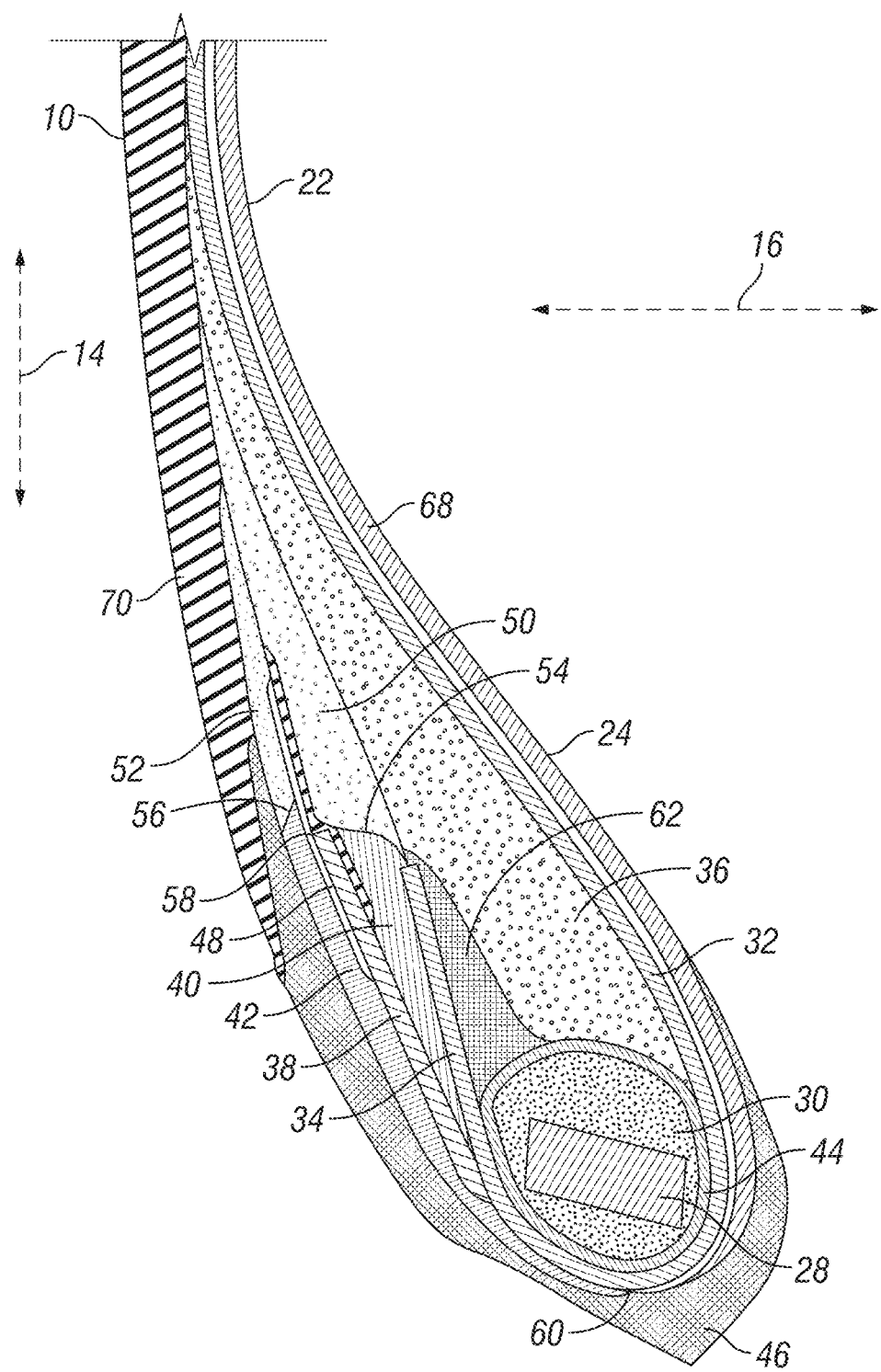
FIG. 6 is a cross-sectional view of a bead that has a third bead layer in accordance with a still further exemplary embodiment.

Another exemplary embodiment of the bead 24 of the tire 10 is shown in FIG. 6 that includes an additional product that is the third bead layer 62. The third bead layer 62 is located between the bead filler 36 and the return casing ply 34 in the axial direction 16 and engages both of these products, and the third bead layer 62 engages the wrapping tissue 44 of the bead 24 and extends outward in the radial direction 14 from the bead 24. The third bead layer 62 has a stiffness that is 8-14 MPa. The stiffness of the third bead layer 62 can be the same as the stiffness of the first and second bead layers 40 and 42 and may be greater than the stiffness of the bead filler 36, and the first and second flexible layers 50, 52 if these layers 50, 52 are present. The third bead layer 62 extends in the radial direction 14 outward to the outer terminal end of the return casing ply 34 and terminates here to share the same location in the radial direction 14. The third bead layer 62 will add additional casing 22 ply unwrapping and fatigue performance. The third bead layer 62 has a cross-sectional size that is less than the bead filler 36, and is located in an outboard region in the axial direction 16 of the bead 24 where stiffness is strategically employed as herein described. Although shown in connection with the FIG. 5 embodiment, the third bead layer 62 can be inserted into any of the other embodiments shown and described.

Although the present design was made to attempt to spread out stresses for casing ply fatigue performance, a large gain in heated rim performance was observed. The heated rim performance may sometimes be known as casing ply unwrapping. The headed rim performance may be equivalent to other designs that use textile or metallic reinforcements to achieve the desired level of heated rim performance. The present tire 10 may thus be provided so that textile or metallic reinforcements for heated rim performance are not present, although it is to be understood that they may in fact be present in some exemplary embodiments.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A heavy truck tire that has a central axis, a radial direction, and an axial direction, comprising:
   a tread;
   a casing that carries the tread, wherein the casing has a bead that has:
   a bead core that has a rod and padding gum;
   a reinforcement ply that wraps around a section of the bead core, wherein the reinforcement ply has a return casing ply a portion of which is outboard in the axial direction from the bead core;
   a bead filler that has a portion radially outward from the bead core in the radial direction and axially inboard from the return casing ply in the axial direction;
   a stiffener layer that has a portion located outboard from the return casing ply in the axial direction;
   a first bead layer that has a portion that is between the return casing ply and the stiffener layer in the axial direction;
   a second bead layer that has a portion that is outboard from the stiffener layer;
   wherein the stiffness of the first bead layer is 8 MPa to 14 MPa;
   wherein the stiffness of the second bead layer is 8 MPa to 14 Mpa;

wherein the stiffness of the bead filler is less than the stiffness of the first bead layer, and wherein the stiffness of the bead filler is less than the stiffness of the second bead layer;

wherein the bead has a first flexible layer that engages the first bead layer and that has a portion located outward from the first bead layer in the radial direction, wherein the stiffness of the first flexible layer is 3.6 to 5.6 Mpa; and wherein the bead has a second flexible layer that engages the second bead layer and that has a portion located outward from the second bead layer in the radial direction, wherein the stiffness of the second flexible layer is 3.6 to 5.6 Mpa.

2. The tire as set forth in claim 1, wherein the first bead layer and the second bead layer extend in the radial direction to terminate at outward radial terminal ends that are located at the same location in the radial direction as an outward radial terminal end of the stiffener layer.

3. The tire as set forth in claim 1, wherein the first flexible layer and the second flexible layer have a stiffness that is the same as the stiffness of the bead filler.

4. The tire as set forth in claim 1, wherein the first flexible layer engages the bead filler, and wherein the first flexible layer engages the second flexible layer.

5. A heavy truck tire that has a central axis, a radial direction, and an axial direction, comprising:
   a tread;
   a casing that carries the tread, wherein the casing has a bead that has:
      a bead core that has a rod and padding gum;
      a reinforcement ply that wraps around a section of the bead core, wherein the reinforcement ply has a return casing ply a portion of which is outboard in the axial direction from the bead core;
      a bead filler that has a portion radially outward from the bead core in the radial direction and axially inboard from the return casing ply in the axial direction;
      a stiffener layer that has a portion located outboard from the return casing ply in the axial direction;
      a first bead layer that has a portion that is between the return casing ply and the stiffener layer in the axial direction;
      a second bead layer that has a portion that is outboard from the stiffener layer;
      wherein the stiffness of the first bead layer is 8 MPa to 14 MPa;
      wherein the stiffness of the second bead layer is 8 MPa to 14 Mpa;
      wherein the stiffness of the bead filler is less than the stiffness of the first bead layer, and wherein the stiffness of the bead filler is less than the stiffness of the second bead layer;
   wherein the second bead layer engages the stiffener layer, wherein the second bead layer has an inner radial terminal end that is located inward in the radial direction from the entire bead core, the entire first bead layer, and the entire bead filler.

6. A heavy truck tire that has a central axis, a radial direction, and an axial direction, comprising:
   a tread;
   a casing that carries the tread, wherein the casing has a bead that has:
      a bead core that has a rod and padding gum;
      a reinforcement ply that wraps around a section of the bead core, wherein the reinforcement ply has a return casing ply a portion of which is outboard in the axial direction from the bead core;
      a bead filler that has a portion radially outward from the bead core in the radial direction and axially inboard from the return casing ply in the axial direction;
      a stiffener layer that has a portion located outboard from the return casing ply in the axial direction;
      a first bead layer that has a portion that is between the return casing ply and the stiffener layer in the axial direction;
      a second bead layer that has a portion that is outboard from the stiffener layer;
      wherein the stiffness of the first bead layer is 8 MPa to 14 MPa;
      wherein the stiffness of the second bead layer is 8 MPa to 14 Mpa;
   wherein the stiffness of the bead filler is less than the stiffness of the first bead layer, and
   wherein the stiffness of the bead filler is less than the stiffness of the second bead layer;
   wherein the bead has a third bead layer that engages the return casing ply and that engages the bead filler, wherein the third bead layer is located inboard in the axial direction relative to a portion of the return casing ply, wherein the third bead layer is located outboard in the axial direction relative to a portion of the bead filler, wherein the stiffness of the third bead layer is 8 MPa to 14 Mpa.

7. The tire as set forth in claim 6, wherein the stiffness of the third bead layer is the same as the stiffness of the first bead layer, and wherein the stiffness of the third bead layer is the same as the stiffness of the second bead layer.

* * * * *